United States Patent [19]
Origgi et al.

[11] Patent Number: 5,588,288
[45] Date of Patent: Dec. 31, 1996

[54] BOOT FOR SHOD ANIMAL'S HOOVES

[76] Inventors: Ambrogio Origgi, Via Canova, 12-29010 Piozzano (Piacenza); Silver Pecis, Via Vallunga, 5-24060 Foresto Sparso (Bergamo), both of Italy

[21] Appl. No.: 337,831

[22] Filed: Nov. 8, 1994

[30] Foreign Application Priority Data

Nov. 10, 1993 [IT] Italy .................. MI93U0875

[51] Int. Cl.⁶ ...................... B68C 5/00
[52] U.S. Cl. ...................... 54/82; 168/1
[58] Field of Search ............... 168/1, 2, 3, 18; 54/82

[56] References Cited

U.S. PATENT DOCUMENTS

| D. 26,832 | 3/1897 | Hirsch | 54/82 |
| 609,551 | 8/1898 | Lang | 168/1 |
| 1,424,869 | 8/1922 | Zingre | 168/3 |
| 3,486,561 | 12/1969 | Kulak | 54/82 X |
| 3,732,929 | 5/1973 | Glass | 168/18 |

FOREIGN PATENT DOCUMENTS

| 153341 | 3/1932 | Switzerland . |
| 196870 | 5/1923 | United Kingdom . |
| 2069305 | 8/1981 | United Kingdom | 168/1 |

Primary Examiner—Robert P. Swiatek
Attorney, Agent, or Firm—Lowe, Price, LeBlanc & Becker

[57] ABSTRACT

A boot for horses' hooves made of flexible material having a sole part and an integral upper part with inner slots at the back, between the sole part and the upper part, provided to accommodate the protruding rear parts of a horseshoe on the hoof. An elastic check tooth is formed at the rear center portion of the upper part. The engagement of the rear parts or "calks" of the horseshoes, together with the tapered shape of the upper, holds the boot on the hoof. The boot preferably extends just high enough to cover the hoof without covering the fleshy parts of the foot.

12 Claims, 2 Drawing Sheets

BOOT FOR SHOD ANIMAL'S HOOVES

FIELD OF THE INVENTION

The present invention relates to the field of protective covers or boots for animals feet.

BACKGROUND OF THE RELATED ART

It is known for a rubber boot to be used for animals' hooves or for a rubber sheet to be placed between the hoof and the horseshoe to exploit the shock-absorbing effect of this material. There are various types of boots on the market, generally intended to protect the hoof if the shoe is accidentally cast, or for emergency or systematic replacement of horseshoes. A problem with these boots is ensuring that they stay on the hoof.

In particular, the boots made of India rubber currently on the market comprise a sole part and an integral upper part. The upper is relatively high so that it encloses not only the hoof but a part of the foot above it and it is fixed to the foot by means of various types laces and in some cases by means of toothed steel clamps inside the boot that bite into the side walls of the hoof.

A drawback of these types of boots is that they can damage the hoof because of the grip exerted by the teeth on the side walls of the hoof. Moreover, contact with hair and skin can give rise to lesions and possible maceration, yet this contact is unavoidable because otherwise the boot would not remain firmly anchored to the hoof.

SUMMARY OF THE DISCLOSURE

The aim of this invention is to create a protective boot for hoofed animals, and more particularly for shod horses, that stays firmly anchored to the foot and yet does not damage the structure of the foot itself. Another aim is to provide for the foot to be well protected and well cushioned from impact. A further aim is to allow the boot to be fitted on shod hooves; yet another aim is to make it possible for the animal to wear the boot for a long time without any particular damage.

These aims and others still have been achieved with a boot as claimed in claim 1. Further new and useful features are stated in the subsequent claims.

The new boot comprises a lower sole part and an upper part that are integral with each other, the upper extending approximately up to the height of the animal's hoof. The boot has two hollows or slots, or a single hollow, in the inner back part that are large enough to accommodate the protruding heel parts of a horseshoe fitted to the hoof. The hollow or hollows are defined at the top by a flexible projection or check tooth that has a tapered upper surface. The boot also has fastening means in the form of a strap or thin plastic-coated cord anchored at the back that can be adjusted and tied at the front, while the upper has a slit at the front that allows it to be adjusted to the animal's hoof by bringing the edges of the slit closer together or further apart.

The advantage of the new boot is that it can be fitted on shod hooves: it does not cover the hair- and skin-covered fleshy parts of the foot, thus avoiding lesions or maceration; it is easy to fit and light, and it does not damage the hoof.

Moreover, it absorbs shocks and vibrations well, prevents injuries and wounds, and increases the life of the horseshoe; it promotes slow growth of the wall of the hoof; it allows journeys, walks or runs to be undertaken without the danger of casting a shoe; it enables boots with a different tread to be used in order to optimize the grip on the terrain without having to change the horseshoe.

BRIEF DESCRIPTION OF THE DRAWING

An exemplary embodiment of the invention will be described below by way of non-restrictive illustration, with reference to the attached drawings in which.

DETAILED DESCRIPTION OF THE PREFERRED EMBODIMENTS

Figure 1:
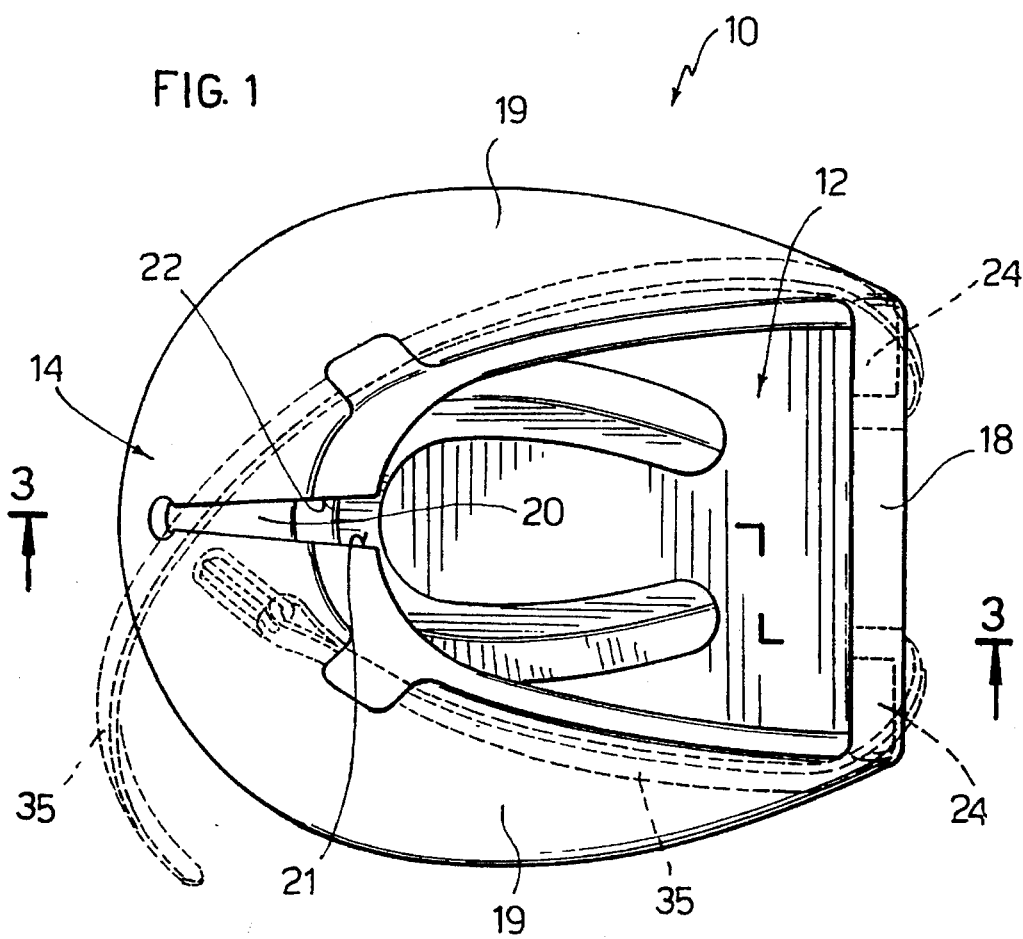
FIG. 1 is a plan view of the boot, on a reduced scale.

With reference to the figures, the boot for horses' hooves, indicated as a whole by the number 10, comprises a sole part 12 and an upper part 14 that are integral with each other, and is made from natural rubber or an equivalent synthetic material. The sole part is of a suitable shape and size to accommodate and support the animal's hoof on which it is to be fitted. The upper part has a front part 16 that tapers towards the top, a short vertical back wall 18, and sides 19, 19 with an upper edge that slopes downwards from front to back. The height of the walls is substantially no greater at any point than the standard height of the walls of the hoof of the animal for which the boot is intended.

The front part 14 has a slit 20 defined by edges 21, 22. Inside, between the rear wall 18 and the sole part there is a single hollow or two hollows 24,24 at a distance from each other, whose width and height are no smaller than the width and height of the tail parts of the horseshoes currently in use. This hollow or these hollows are defined at the top by a protruding wall 26 formed from material of the shoe, this protruding wall being sufficiently elastic to allow the tail parts to pass and having a tapered sloping upper surface 28 and a stepped lower surface 30.

Figure 5:
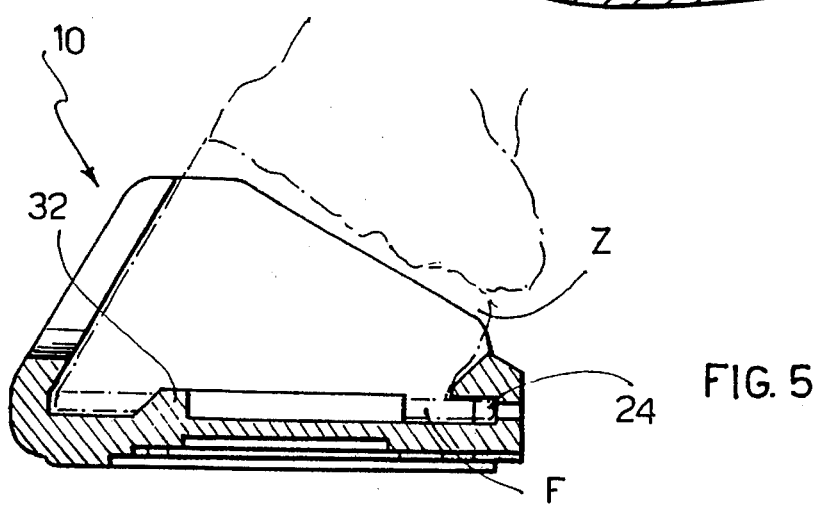
FIG. 5 shows the boot, in the same section as in FIG. 3, worn on a shod horse's hoof.

The inner surface of the sole has an arc-shaped projection 32 that defines a peripheral housing 34 to accommodate a horseshoe F (FIG. 5) fitted to a hoof Z.

Figure 2:
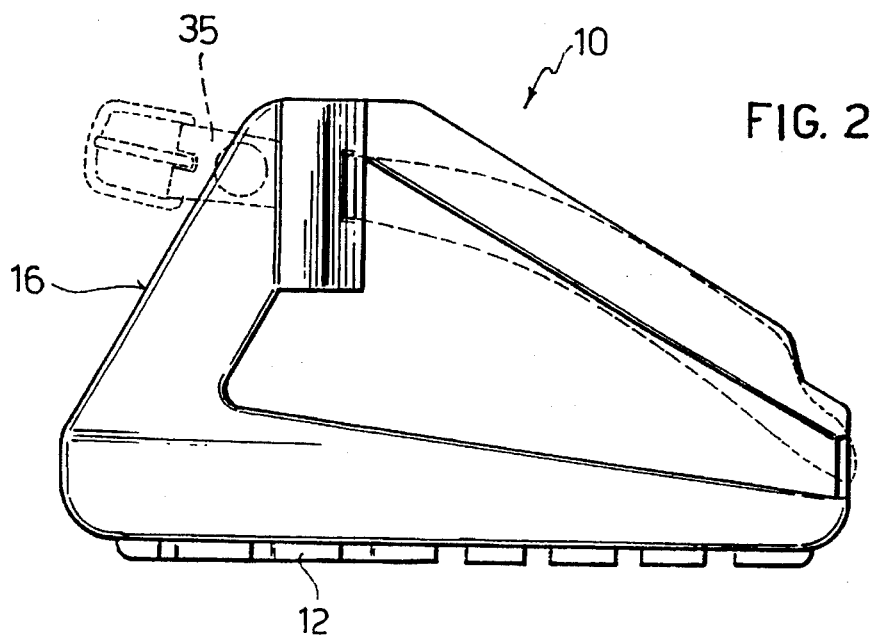
FIG. 2 is an elevational side view of the boot.
Figure 3:
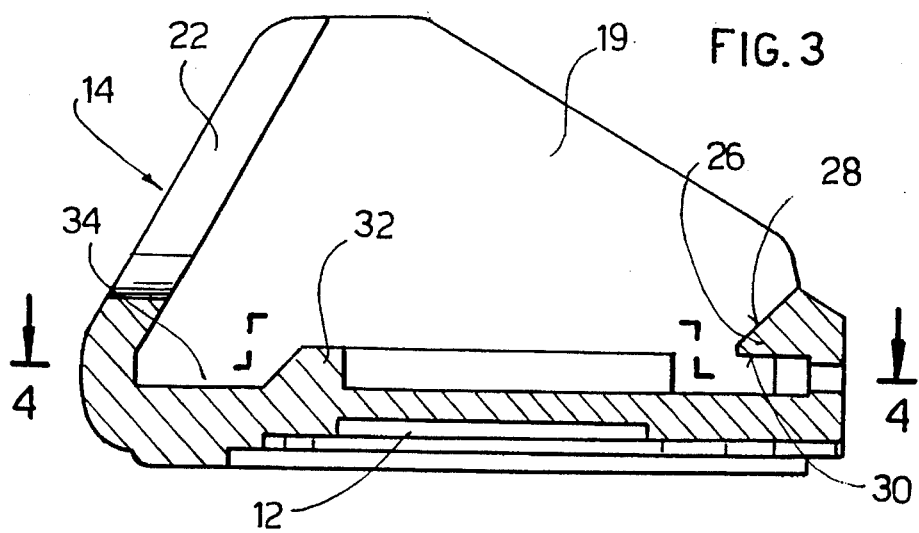
FIG. 3 is a vertical section taken along 3—3 in FIG. 1.
Figure 4:
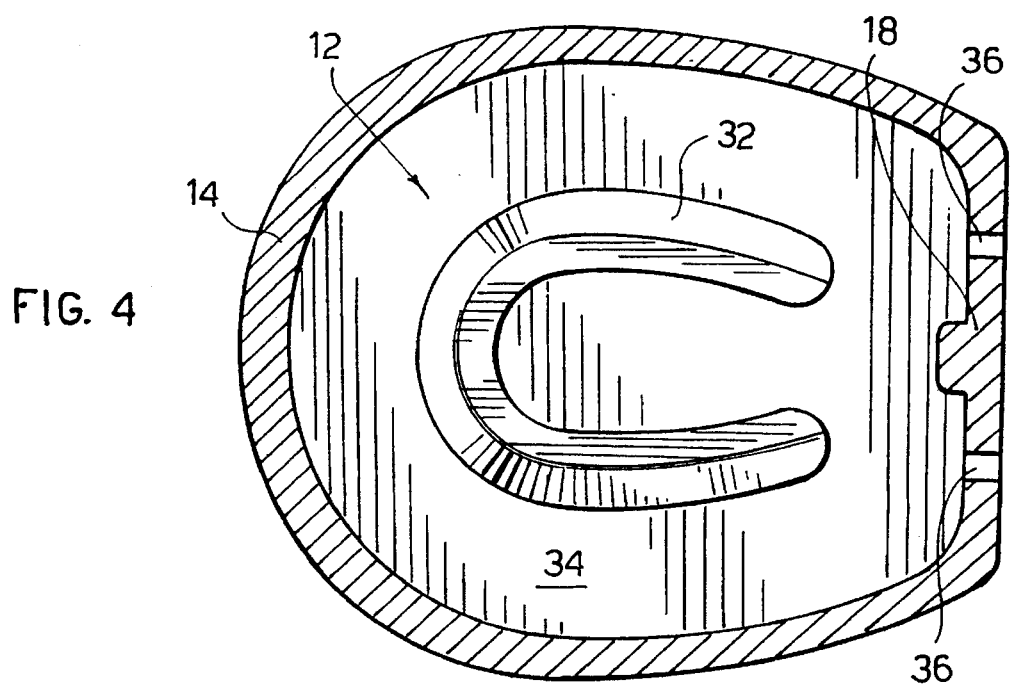
FIG. 4 is a section taken along 4—4 in FIG. 3.

A lace-like element 35 (indicated by a dashed line in FIGS. 1 and 2) can be applied to the boot in various ways; for example two through holes 36 are provided in the back part of the boot 10 through which the front-tying lace 35 or plastic coated cord is passed and/or anchored.

Although the present invention has been described and illustrated in detail, it should be clearly understood that the same is by way of illustration and example only and is not to be taken by way of limitation, the spirit and scope of the present invention being limited only by the terms of the appended claims.

We claim:

1. A boot made of flexible elastic material for the hooves of hoofed animals, comprising:

a sole part; and an upper part that is integral with the sole part and defines therewith a housing to accommodate a hoof, wherein the sole part has a seat formed inside to accommodate a shoe fitted to the hoof and at least one hollow at the back for protruding heel parts of the shoe, said at least one hollow being defined at its top by an elastic check tooth, wherein said check tooth has a sloping upper surface tapered downwardly toward the inside of the sole part, and a sharply projecting lower surface.

2. A boot according to claim 1, wherein:

the height of the upper part at the front, sides and back of the boot is such as not to exceed a corresponding height of the adjacent side of the animal's hoof.

3. A boot according to claim 1, wherein:

said seat for the shoe is defined on the inside by an arc-shaped projection.

4. A boot according to claim 1, wherein:

the upper part has an upwardly extending slit at the front.

5. A boot according to claim 1, further comprising:

a lace or cord to fasten the boot to the hoof.

6. A boot made of flexible elastic material for the hooves of hoofed animals, comprising:

a sole part; and an upper part that is integral with the sole part and defines therewith a housing to accommodate a hoof, wherein the sole part has a seat formed inside to accommodate a shoe fitted to the hoof and at least one hollow at the back for protruding heel parts of the shoe, said at least one hollow being defined at its top by an elastic check tooth, a lace or cord to fasten the boot to the hoof, wherein there are provided two through holes at the back of the upper part to hook or anchor the fastening lace or cord thereat.

7. A boot made of flexible elastic material for the hooves of hoofed animals, comprising:

a sole part;

an upper part that is integral with the sole part and defines therewith a housing to accommodate a hoof, wherein the sole part has a seat formed inside to accommodate a shoe fitted to the hoof and at least one hollow at the back for protruding heel parts of a shoe, said at least one hollow being defined at its top by an elastic check tooth; and a lace-like element anchored in a first part of the boot, for tying to another part of the boot to retain the hoof in the boot, wherein the lace-like element is anchored at the back of the boot and has a front-tying portion.

8. A boot according to claim 7, wherein:

the height of the upper part at the front, sides and back thereof is such as not to exceed the adjacent height of the animal's hoof.

9. A boot according to claim 7, wherein:

said seat for the shoe is defined on the inside by an arc-shaped projection.

10. A boot according to claim 7, wherein:

the upper part has a slit at the front that extends upwards.

11. A boot according to claim 7, wherein:

two through holes are provided at the back of the boot to anchor the lace-like element.

12. A boot made of flexible elastic material for the hooves of hoofed animals, comprising:

a sole part;

an upper part that is integral with the sole part and defines therewith a housing to accommodate a hoof, wherein the sole part has a seat formed inside to accommodate a shoe fitted to the hoof and at least one hollow at the back for protruding heel parts of a shoe, said at least one hollow being defined at its top by an elastic check tooth; and a lace-like element anchored in a first part of the boot, for tying to another part of the boot to retain the hoof in the boot, wherein said check tooth has a sloping surface tapered downwardly toward the inside of the sole and a sharply projecting lower surface.

* * * * *